United States Patent [19]

Nunes

[11] Patent Number: 4,951,350
[45] Date of Patent: Aug. 28, 1990

[54] COMPOSITE HINGE PIN

[76] Inventor: Anthony M. Nunes, 1401 N. Elk Valley Rd., Crescent City, Calif. 95531

[21] Appl. No.: 361,998

[22] Filed: Jun. 5, 1989

[51] Int. Cl.⁵ .............................................. E05D 5/10
[52] U.S. Cl. ........................................ 16/263; 16/380; 16/386; 403/156; 280/677; 280/679; 280/681
[58] Field of Search .......................................... 16/2-3, 16/37, 228-229, 244, 254, 261-264, 380-381, 386, DIG. 33, DIG. 41, 379, 265; 403/156, 161-163, 224, 296-297, 305, 307; 411/383-384, 389; 280/677, 679, 681; 301/105 R, 105 S, 124 R

[56] References Cited

U.S. PATENT DOCUMENTS

| | | | |
|---|---|---|---|
| 1,476,797 | 11/1923 | Carlin . | |
| 1,555,603 | 9/1925 | Overing, Jr. | 16/386 |
| 2,102,420 | 12/1937 | Kogstrom | 16/381 |
| 3,600,015 | 8/1971 | McMullen | 403/156 |
| 4,078,276 | 3/1978 | Nunes | 16/271 |
| 4,152,085 | 5/1979 | Brisson | 403/161 |
| 4,377,350 | 3/1983 | Josephson | 403/161 |
| 4,500,110 | 2/1985 | McWhorter et al. | 280/680 |
| 4,770,584 | 9/1988 | Vinciguerra | 411/389 |

FOREIGN PATENT DOCUMENTS 1096723  12/1967  United Kingdom ................. 16/386

Primary Examiner—Richard K. Seidel
Assistant Examiner—Edward A. Brown
Attorney, Agent, or Firm—James D. Givnan, Jr.

[57] ABSTRACT

A hinge pin of segmented form with its components in threaded connection with one another. The components of the pin include tool receiving surfaces engageable by a wrenching tool for applying torque during assembly and disassembly of the pin. The components are provided with male and female threads.

8 Claims, 1 Drawing Sheet

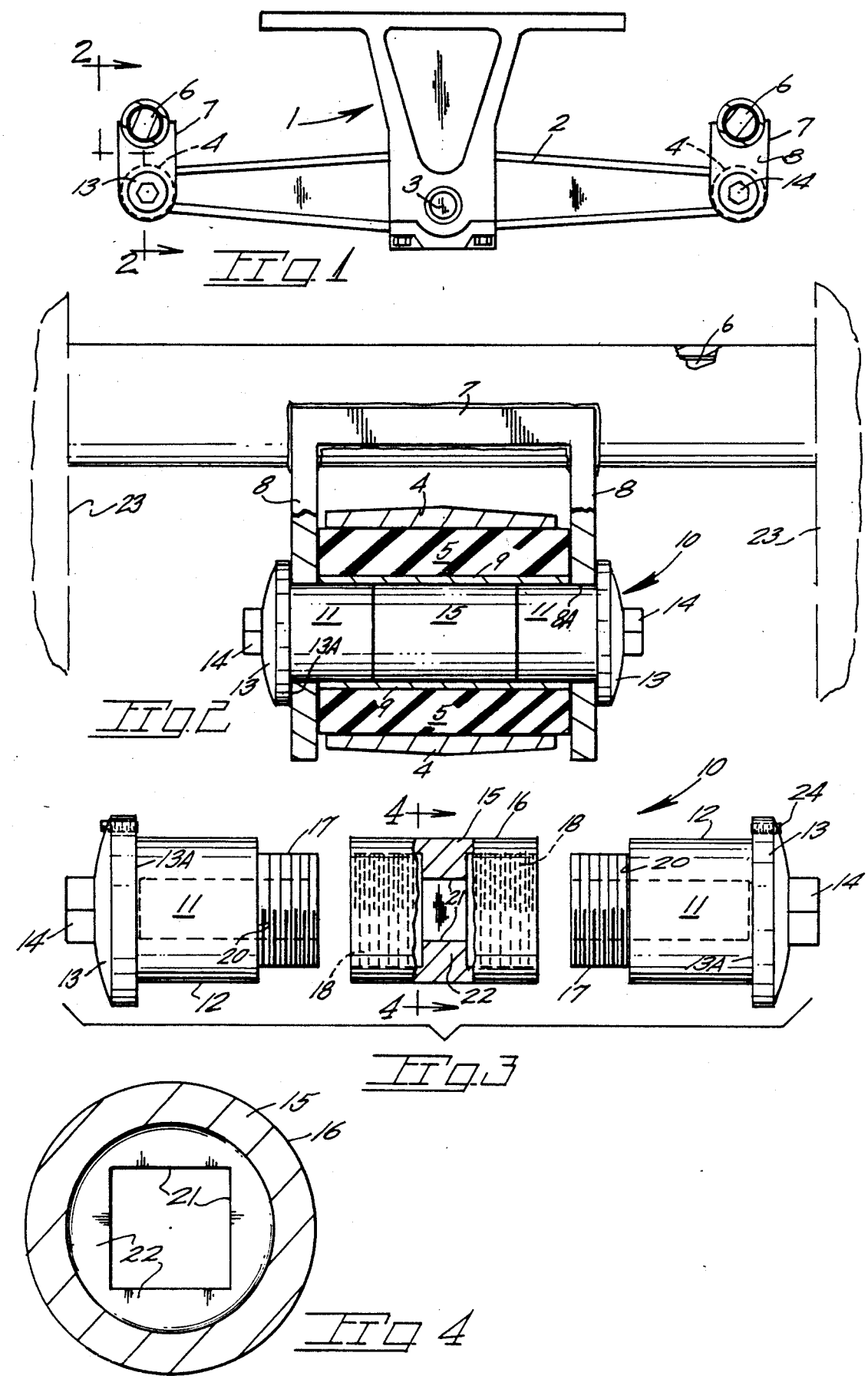

COMPOSITE HINGE PIN

BACKGROUND OF THE INVENTION

The present invention pertains generally to hinge pin construction for joining components for travel, singly or jointly, about a hinge pin axis.

Large hinge pins are customarily used in truck undercarriages to couple truck axles to a walking beam of the undercarriage. As truck undercarriages are subjected to severe loads and shocks, it is necessary to periodically replace rubber bushings which are carried by the walking beam with a hinge pin passing therethrough and through an axle mounted bracket.

The present inventor is the patentee of U.S. Pat. No. 4,078,276 which is based on a two-piece hinge pin. The patent describes the problems encountered when truck undercarriage hinge pins are of one-piece construction. The patented hinge pin alleviated several problems encountered with one-piece hinge pins.

As the replacement of walking beam bushings in a truck undercarriage entails hinge pin removal, a problem results from the restricted clearance between a hinge pin end and the inner wheel dual wheels. Accordingly, in such instances, it is necessary to remove the dual wheels which entails considerable time, effort and cost to the truck operator or owner. Removal of truck wheels during undercarriage repair work also incurs added liability exposure to the repair facility.

SUMMARY OF THE PRESENT INVENTION

The present invention is embodied in a hinge pin having end members removably coupled to an intermediate member and which may be readily disassembled to facilitate hinge pin removal and reinstallation.

The hinge pin members are of an outer diameter for endwise insertion into the resilient sleeve or bushing at the ends of an undercarriage walking beam. The hinge pin members may be individually removed and installed from a sleeve type bushing of the undercarriage without hinderance by the inner wheel of a truck's dual wheels to enable bushing replacement without wheel removal.

Threaded portions of the pin members permit assembly of the end members and, conversely, serve to urge the end members outwardly of the bushing during pin removal. Means are provided on the intermediate pin member to receive a tool to prevent rotation of the member during pin disassembly. External tool receiving surfaces are provided on the end members for applying torque thereto.

Important objectives of the present hinge pin is the provision of a segmented hinge pin having members which when disassembled from one another may be easily removed from a truck undercarriage without wheel removal being necessary; the provision of a hinge pin of rugged construction to avoid deformation by loads typically encountered by truck undercarriage components; the provision of a hinge pin having end and intermediate members which may be installed and removed with ordinary hand tools; the provision of a hinge pin having an intermediate member with an internal tool receiving surface to control rotation of the member during hinge pin removal.

BRIEF DESCRIPTION OF THE DRAWINGS

In the accompanying drawings:

FIG. 1 is an elevational view of a walking beam in a truck suspension system with associated axles;

FIG. 2 is a sectional view taken along line 2—2 of FIG. 1 showing the present hinge pin;

FIG. 3 is an exploded view of the present hinge pin; and

FIG. 4 is a vertical sectional view taken along line 4—4 of FIG. 3.

DETAILED DESCRIPTION OF THE PREFERRED EMBODIMENTS

With continuing attention to the drawings wherein applied reference numerals indicate parts similarly hereinafter identified, the reference numeral 1 indicates generally a portion of a truck undercarriage supporting a truck frame.

The undercarriage includes a walking beam 2 which rocks about the horizontal axis of pivot shaft 3. At the identical ends of the walking beam are collars as at 4 in which are housed resilient rubber bushings as at 5.

Typically such walking beams carry truck axles as at 6 with an axle mounted bracket 7 having apertured flanges 8 for hinge pin reception. The present hinge pin is indicated generally at 10 and extends through rubber bushing 5 housed within the walking beam collars. Further, it is common practice to equip such bushings with an internal sleeve 9 which is part of the bushing as sold. Flange apertures are at 8A.

With attention now to the present invention, the composite hinge pin 10 includes end members 11 each having a cylindrical outer wall 12 of a diameter occupying the apertures of each bracket flange. A head portion 13 of each end member includes tool receiving means 14 for imparting torque to the end member or holding same against rotation during pin assembly or disassembly. A head surface 13A abuts the flange 8.

An intermediate member 15 of the hinge pin has an outer wall 16 formed on the same radius as the end member outer walls so as to provide a cylindrical outer surface of the hinge pin on which bushing 5 is carried. The hinge pin end members and intermediate member are in threaded engagement with one another by means of screw threads at 17 and 18. When assembled, shoulders at 20 on the end member abut the ends of intermediate member 15 with the hinge pin fully occupying the rubber bushing. Internal surfaces 21 of the intermediate member serves to receive a wrench type tool to hold the intermediate member against rotation, subsequent to removal of an end member, during further hinge pin disassembly. Surfaces 21 are conveniently provided by means of an internal wall 22 disposed so as to permit convenient tool engagement from either direction. Surfaces 21 may be, for example, the surfaces of a hexagonal or square opening.

In assembly, hinge pin intermediate member 15 is inserted into bushing 5 and the walking beam collar 4 axially aligned with flange apertures 8A to permit partial insertion of end members 11. Such assembly of the present hinge pin is accomplished without interference from axle hubs at 23 as would be the case with a standard or full length hinge pin. The application of torque to the tool receiving means 14 completes hinge pin assembly in bushing 5. Disassembly of the hinge pin, as for example during bushing replacement, is accomplished by applying loosening torque force to an end member with the remaining end member held by a wrench type tool against rotation. With an end member removed, intermediate member 15 is accessible for the attachment of a tool to hold same against rotation while the remaining end member is backed out of bushing 5. With the end members removed, the walking beam collar 4 may be removed from between bracket flanges 8 and worn bushing 5 removed.

If so desired, set screws at 24 in each head 13 may seat against a flange 8 to prevent head movement.

It will be understood that head 13 may be formed with a recess to provide tool receiving means for torque application.

While I have shown but one embodiment of the invention, it will be apparent to those skilled in the art that the invention may be embodied still otherwise without departing from the spirit and scope of the invention.

Having thus described the invention, what is claimed is:

1. A composite hinge pin comprising,
   end members and an intermediate member all having cylindrical outer surfaces of like diameter to form a pin outer wall,
   screw threads on said end members and said intermediate member, and
   said intermediate member having surfaces for torque tool application to said member.

2. The hinge pin claimed in claim 1 wherein said end members each include a head portion having tool receiving means thereon for applying torque thereto during hinge pin assembly and disassembly.

3. The hinge pin claimed in claim 1 wherein each head portion includes an annular surface for abutment with a pin supporting structure.

4. The hinge pin claimed in claim 2 wherein said tool receiving means include external surfaces on the head portion of each end member.

5. The hinge pin claimed in claim 1 wherein the screw threads on said intermediate member are female threads.

6. The hinge pin claimed in claim 1 wherein said intermediate member includes an internal wall with said surfaces formed thereon.

7. The hinge pin claimed in claim 6 wherein said surfaces define a tool receiving opening extending through said internal wall.

8. A composite hinge pin comprising,
   end members and an intermediate member all having cylindrical outer surfaces to form a pin outer wall,
   screw threads on said end members and said intermediate member,
   the screw threads on said intermediate member being female threads, and
   said intermediate member having surfaces for torque tool application to said member.

* * * * *